United States Patent
Pan et al.

(10) Patent No.: US 8,023,399 B2
(45) Date of Patent: *Sep. 20, 2011

(54) CHANNEL ESTIMATION IN A WIRELESS COMMUNICATION SYSTEM

(75) Inventors: Jung-Lin Pan, Selden, NY (US); Younglok Kim, Seoul (KR); Ariela Zeira, Huntingdon, NY (US)

(73) Assignee: InterDigital Technology Corporation, Wilmington, DE (US)

(*) Notice: Subject to any disclaimer, the term of this patent is extended or adjusted under 35 U.S.C. 154(b) by 1005 days.

This patent is subject to a terminal disclaimer.

(21) Appl. No.: 11/894,282

(22) Filed: Aug. 20, 2007

(65) Prior Publication Data

US 2007/0291641 A1    Dec. 20, 2007

Related U.S. Application Data

(63) Continuation of application No. 10/308,473, filed on Dec. 3, 2002, now Pat. No. 7,260,056.

(60) Provisional application No. 60/384,194, filed on May 29, 2002.

(51) Int. Cl.
*H04J 11/00* (2006.01)
*H04B 7/216* (2006.01)
*H04B 1/69* (2011.01)
*H03D 1/04* (2006.01)

(52) U.S. Cl. ........ 370/210; 370/280; 370/335; 370/342; 375/131; 375/147; 375/346

(58) Field of Classification Search .................. 370/210, 370/280, 335, 342; 375/131, 147, 346
See application file for complete search history.

(56) References Cited

U.S. PATENT DOCUMENTS

| 6,381,260 | B1* | 4/2002 | Bahrenburg et al. | 375/130 |
| 6,608,859 | B2 | 8/2003 | De et al. | |
| 6,625,203 | B2 | 9/2003 | De et al. | |
| 6,760,365 | B2* | 7/2004 | Demir et al. | 375/150 |
| 6,795,417 | B2 | 9/2004 | Zeira et al. | |
| 6,873,662 | B2 | 3/2005 | Oh et al. | |
| 6,885,649 | B2 | 4/2005 | Zeira et al. | |
| 6,934,271 | B2 | 8/2005 | Zeira et al. | |
| 6,985,513 | B2 | 1/2006 | Zeira | |
| 7,027,495 | B2* | 4/2006 | Demir et al. | 375/150 |
| 7,085,248 | B1* | 8/2006 | Holma et al. | 370/329 |
| 7,095,731 | B2* | 8/2006 | Kim et al. | 370/342 |

(Continued)

FOREIGN PATENT DOCUMENTS

EP    1069707 A1 * 1/2001

*Primary Examiner* — Alpus H Hsu
(74) *Attorney, Agent, or Firm* — Volpe and Koenig, P.C.

(57) ABSTRACT

A plurality of communication bursts are transmitted substantially simultaneously in a time slot of a time division duplex/code division multiple access communication system. The communication system has a maximum number of K midamble shifts. Each burst has an assigned midamble. Each midamble is a shifted version of a basic midamble code having a period of P. A combined signal is received. The combined signal includes a received version of each of the communication burst's midambles. A P by P square circulant matrix is constructed including the K midamble shifts. A channel response is determined for each of the K midamble shifts using a prime factor algorithm (PFA) discrete Fourier transform (DFT) algorithm, the received combined signal and the P by P square circulant matrix. The PFA DFT algorithm has a plurality of stages. Each stage has P inputs.

6 Claims, 4 Drawing Sheets

U.S. PATENT DOCUMENTS

| | | |
|---|---|---|
| 7,103,092 B2 | 9/2006 | Zeira |
| 7,428,278 B2 * | 9/2008 | Buchert et al. ............... 375/346 |
| 7,443,908 B2 * | 10/2008 | Simoni et al. ............... 375/148 |
| 2002/0061005 A1 * | 5/2002 | Lee et al. ............... 370/342 |
| 2003/0026236 A1 | 2/2003 | De et al. |
| 2003/0210754 A1 | 11/2003 | Buchert et al. |
| 2005/0169198 A1 | 8/2005 | Zeira et al. |
| 2005/0169216 A1 | 8/2005 | Zeira et al. |

* cited by examiner

FIG. 6 ces. Using the estimated channel response, data from the data fields is recovered at the receiver.

It is desirable to have efficient approaches to perform channel estimation.

SUMMARY

A plurality of communication bursts are transmitted substantially simultaneously in a time slot of a time division duplex/code division multiple access communication system. The communication system has a maximum number of K midamble shifts. Each burst has an assigned midamble. Each midamble is a shifted version of a basic midamble code having a period of P. A combined signal is received. The combined signal includes a received version of each of the communication burst's midambles. A P by P square circulant matrix is constructed including the K midamble shifts. A channel response is determined for each of the K midamble shifts using a prime factor algorithm (PFA) discrete Fourier transform (DFT) algorithm, the received combined signal and the P by P square circulant matrix. The PFA DFT algorithm has a plurality of stages. Each stage has P inputs.

DETAILED DESCRIPTION OF THE PREFERRED EMBODIMENT(S)

Although the preferred embodiments are described in conjunction with a preferred TDD/CDMA or TDMA/CDMA communication system, some aspects are also applicable to CDMA systems in general.

Figure 1:
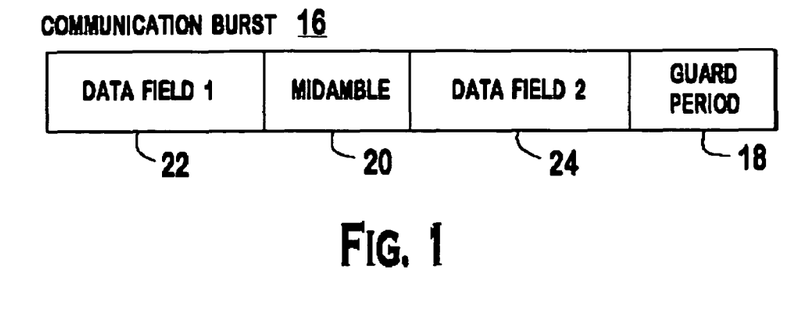
FIG. 1 is an illustration of a communication burst.
Figure 2:
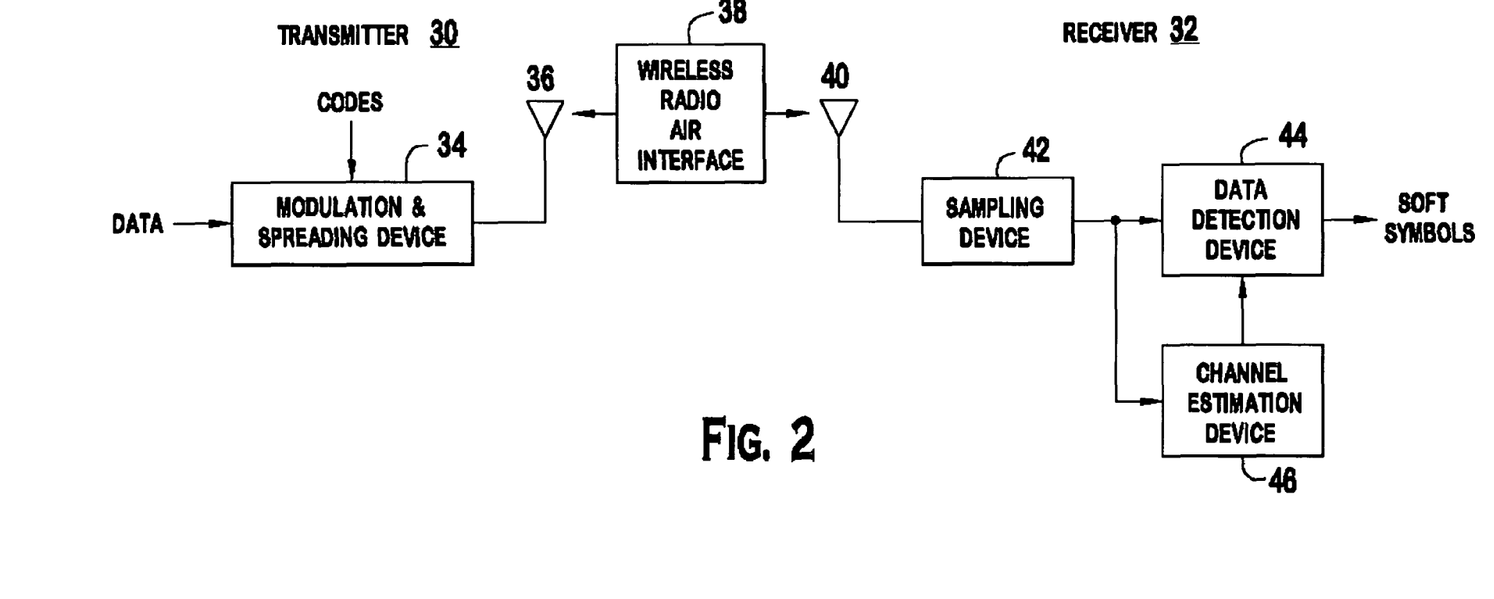
FIG. 2 is a simplified diagram of a transmitter and a receiver using channel estimation.

FIG. 2 illustrates an embodiment of channel estimation as used in a wireless communication system. A transmitter 30 and a receiver 32 are shown in FIG. 2. The transmitter 30 may be located at a user equipment or multiple transmitting circuits 30 may be located at the base station. The receiver 32 may be located at either the user equipment, base station or both.

Data symbols to be transmitted to the receiver 32 are processed by a modulation and spreading device 34 at the transmitter 30. The spreading and modulation device 34 spreads the data with the codes and at a spreading factor(s) assigned to the communication(s) carrying the data. The communication(s) are radiated by an antenna 36 or antenna array of the transmitter 30 through a wireless radio interface 38.

At the receiver 32, the communication(s), possibly along with other transmitters' communications, are received at an antenna 40 or antenna array of the receiver 32. The received signal is sampled by a sampling device 42, such as at the chip rate or at a multiple of the chip rate, to produce a received vector. The received vector is processed by a channel estimation device 46 to estimate the channel impulse responses for the received communications. The channel estimation device 46 uses a training sequence in the received communication to estimate the channel experienced by each communication. A data detection device 44, such as a joint detection device, uses the code(s) of the received communication(s) and the estimated impulse response(s) to estimate soft symbols of the spread data.

Figure 3:
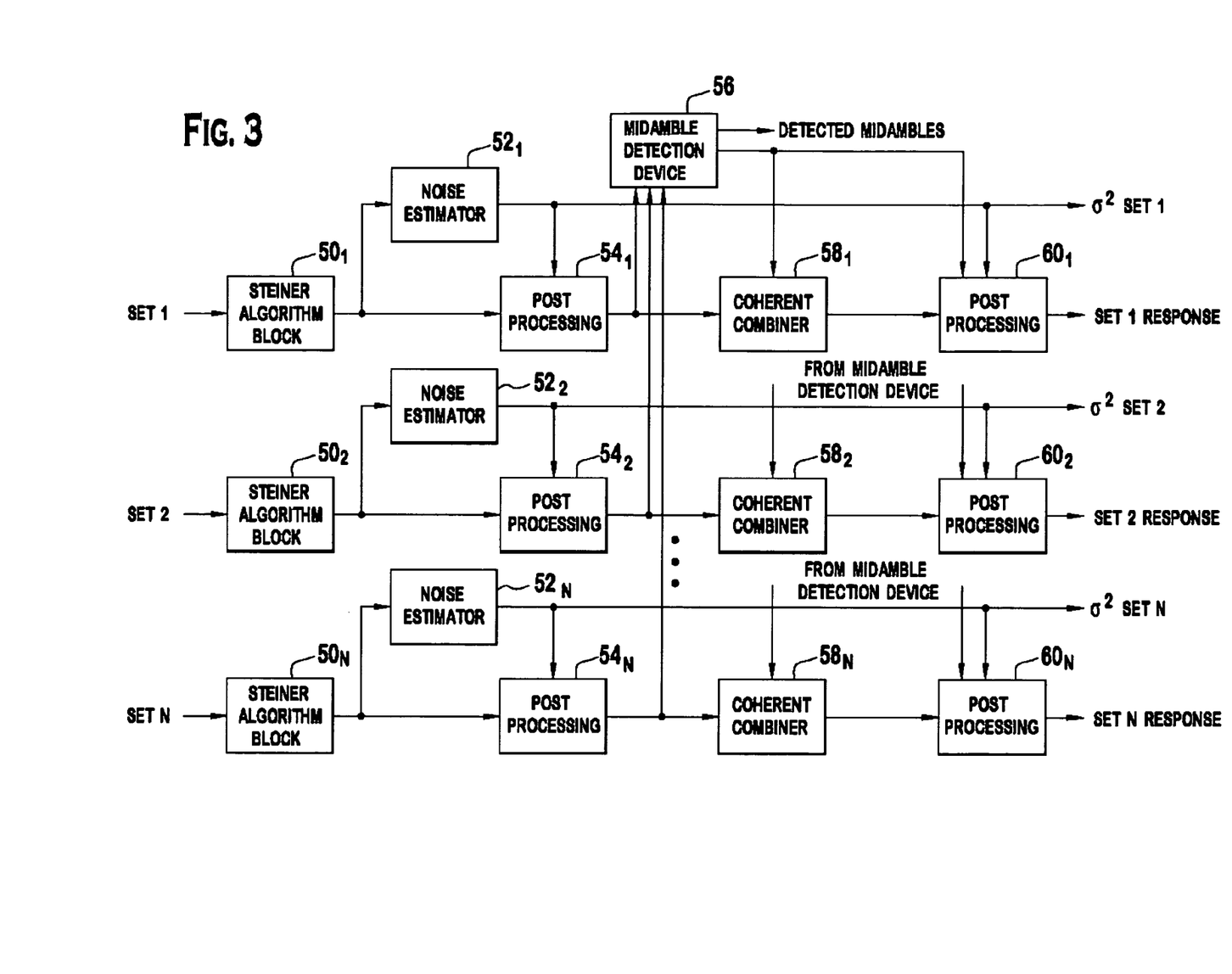
FIG. 3 is a simplified diagram of a preferred channel estimator.

FIG. 3 illustrates a preferred multiple, N, chip rate channel estimation device. Although this channel estimation device preferably uses a PFA discrete Fourier transform (DFT) to implement the Steiner algorithm, other implementations of the Steiner algorithm may be used.

Each set of the N multiple chip rate samples is input into a Steiner algorithm block $50_1$-$50_N$ (50). For each set of samples, the Steiner algorithm uses all the possible midamble shifts to estimate the channel for each midamble shift. Each set's channel estimates are processed by a noise estimator $52_1$-$52_N$ (52) to estimate the noise, as a noise variance ($\sigma^2$), in the estimates. Using the noise estimate $\sigma^2$, the channel estimates are compared to a first threshold derived from the noise estimate. Estimates less than the first threshold are eliminated by a post processing blocks $54_1$-$54_N$ (54). Some of the estimates correspond to multipaths of the transmitted signals and other estimates result from noise. By eliminating estimates below the first threshold, the post processing block 54 filters out the noise to improve the midamble detection process.

When received bursts experience a different channel response, such as in the uplink for the third generation partnership project (3GPP) TDD mode, preferred values for the first threshold are 0.0063 $\sigma^2$ for burst type I and 0.015 $\sigma^2$ for burst type II, although the thresholds for this type of implementation as well as others may vary.

The processed estimates from all the N sets are analyzed by a midamble detection block 56. The midamble detection block 56 determines which midamble shifts out of K possible midamble shifts were received. The midamble shifts having a power level significantly different than zero are detected midamble shifts.

As shown in FIG. 3, coherent combiners $58_1$-$58_N$ (58) are used to combine the different sets estimates to aid in the data detection. Preferably, the sets are combined and scaled to their original amplitude. The coherent combiners 58 are optional and may not be used. Post processing blocks $60_1$-$60_N$ (60) compare the estimates to a second threshold also derived from the noise estimate $\sigma^2$. Estimates less than the second threshold are eliminated to aid in the data detection procedure. When received bursts experience a different channel response (such as in the uplink) for 3GPP TDD mode, preferred values for the second threshold are 0.016 $\sigma^2$ for burst type I and 0.037 $\sigma^2$ for burst type II, although the thresholds for this type of implementation as well as others may vary. Using each set's derived channel response, the data detection device 44 recovers data from the received communication bursts.

The following is a description of preferred embodiments for the Steiner algorithm blocks 50. These blocks 50 preferably perform a Steiner algorithm type channel estimation using a PFA DFT approach. When received bursts experience a different channel response (such as in the uplink) for 3GPP TDD mode, preferred values for the second threshold are 0.016 $\sigma^2$ for burst type I and 0.037 $\sigma^2$ for burst type II, although the thresholds for this type of implementation as well as others may vary.

In TDD mode of a 3GPP wideband code division multiple access (W-CDMA) communication system, K midamble codes are used. Each midamble code is a time shifted version of a periodic single basic midamble code, $m_P$. $m_P$ has a period of P. The length, $L_m$, of each time-shifted midamble code in chips is the period, P, added to the length of the impulse response, W, less one chip, $L_m=P+W-1$. The relationship between K, W and P is KW=P. For a TDD 3GPP system, the values for K, P, W and $L_m$ are shown for burst types 1, 2 and 3 in Table 1. K' is the maximum number of midamble shifts in a cell, when no intermediate shifts are used.

TABLE 1

| PARAMETER | BURST TYPE 1/3 | | | BURST TYPE 2 | |
|---|---|---|---|---|---|
| | LONG | NOMINAL | SHORT | NOMINAL | SHORT |
| RESPONSE LENGTH, $L_r$ | 114 | 57 | 28 | 64 | 32 |
| K | 4 | 8 | 16 | 3 | 6 |
| K' | | 8 | | 3 | |
| P | | 456 | | 192 | |
| W | | 57 | | 64 | |
| $L_m$ | | 512 | | 256 | |

$L_r$ is the response length.

For burst type 1 and 2 of nominal response length, the basic midamble code, $m_P$, is a sequence having the values of either 1 or −1. Each $i^{th}$ element, $m_P(i)$ of the sequence $m_P$ is converted to a corresponding $i^{th}$ element, $\tilde{m}_P(i)$, of a complex sequence, $\tilde{m}_P$, per Equation 1.

$$\tilde{m}_P(i) = j^i \cdot m_P(i), i=1 \ldots P \qquad \text{Equation 1}$$

The K midamble shifts are derived by picking K subsequences of length $L_m$ from a 2P long sequence. The long sequence is formed by concatenating two periods of $\tilde{m}_P$. For a $k^{th}$ sequence of the K sequences, each $i^{th}$ element, $\overline{m}_i^{(k)}$ is derived from $\tilde{m}_P$ per Equation 2.

$$\underline{m}_i^{(k)} = \tilde{m}_P\left[(K-k)W + \left\lfloor \frac{P}{K} \right\rfloor + i\right], \qquad \text{Equation 2}$$

$$\text{for } 1 \le i \le P - (K-k)W - \left\lfloor \frac{P}{K} \right\rfloor$$

$$= \tilde{m}_P\left[i - P + (K-k)W + \left\lfloor \frac{P}{K} \right\rfloor\right],$$

$$\text{for } P - (K-k)W - \left\lfloor \frac{P}{K} \right\rfloor \le i \le P + W - 1$$

Figure 4:
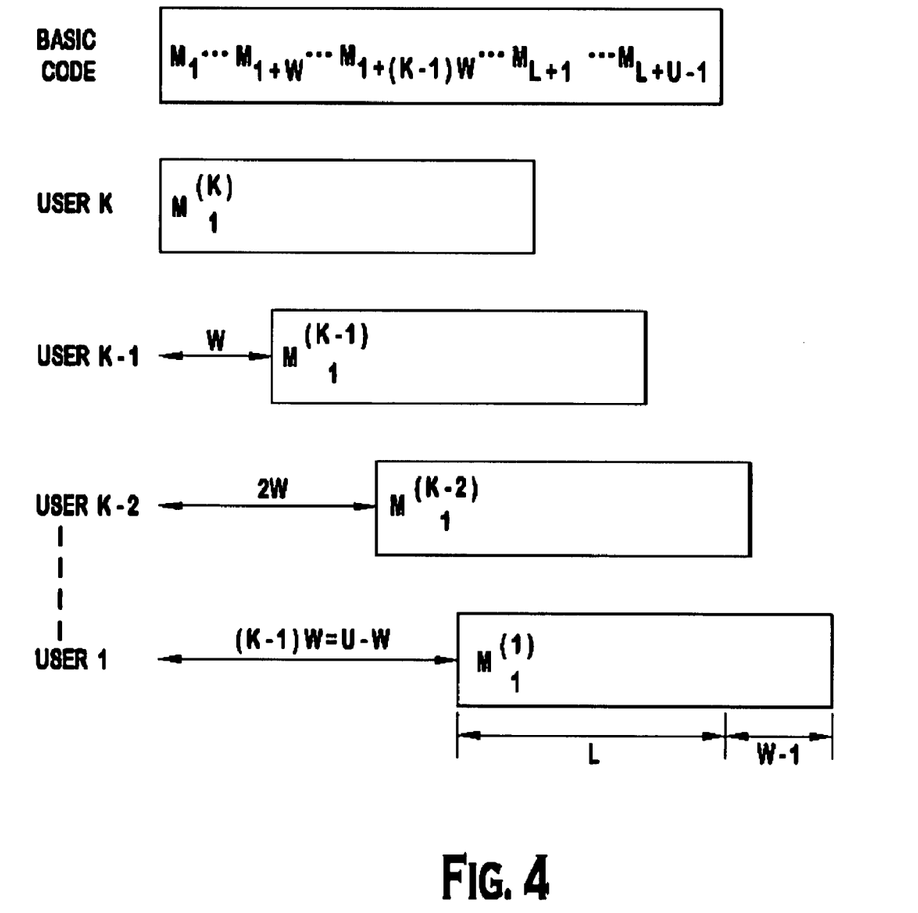
FIG. 4 is an illustration of constructing midamble shifts.

As k increases from 1 to K, the starting point of $m^{(k)}$ shifts to the left by W, as shown in FIG. 4. FIG. 4 is an illustration of the derivation of the K midamble shifts. The value U in FIG. 4 is defined as U=K·W.

For the short response length of burst types 1 and 2, the maximum number of midamble shifts, K, is doubled to 16 for burst type 1 and 6 for burst type 2. K' is the number of midamble shifts prior to doubling, 8 for burst type 1 and 3 for burst type 2. The first K' of the K midamble shifts are determined as per the nominal case, Equation 2. The last K' shifts are determined per Equation 3.

$$\underline{m}_i^{(k)} = \tilde{m}_P[(K-k)W + i], \qquad \text{Equation 3}$$

$$\text{for } 1 \le i \le P - (K-k)W$$

$$= \tilde{m}_P[i - P + (K-k)W],$$

$$\text{for } P - (K-k)W \le i \le P + W - 1$$

For the long response length of burst type 1, the procedure is the same as the burst type 1 nominal response length, except the successive shifts, $L_r$, in constructing the midambles is 114 and K=4.

The combined received midamble sequences can be viewed as a convolution of K convolutions. The $k^{th}$ convolution is the convolution of $m^{(k)}$ with $h^{(k)}$. $h^{(k)}$ is the channel response of the $k^{th}$ midamble. Since the impulse response from the first data field corrupts the first W−1 chips of the midamble, only the last $L_m$−W+1 or P chips of the midamble are used for channel estimation. For nominal burst types 1 and 2, the K convolutions are per Equation 4.

$$\begin{bmatrix} \underline{m}_P & \cdots & \underline{m}_{(K-1)W+1} & \vdots & \underline{m}_{(K-1)W} & \cdots & \underline{m}_{(K-2)W+1} & \vdots & \vdots & \underline{m}_W & \cdots & \underline{m}_1 \\ \underline{m}_1 & \cdots & \underline{m}_{(K-1)W+2} & \vdots & \underline{m}_{(K-1)W+1} & \cdots & \underline{m}_{(K-2)W+2} & \vdots & \vdots & \underline{m}_{W+1} & \cdots & \underline{m}_2 \\ \underline{m}_2 & \cdots & \underline{m}_{(K-1)W+3} & \vdots & \underline{m}_{(K-1)W+2} & \cdots & \underline{m}_{(K-2)W+3} & \vdots & \cdots & \vdots & \underline{m}_{W+2} & \cdots & \underline{m}_3 \\ \vdots & \vdots & \vdots & \vdots & \vdots & \vdots & \vdots & \vdots & \vdots & \vdots & \vdots & \vdots \\ \underline{m}_{KW-1} & \cdots & \underline{m}_{(K-1)W} & \vdots & \underline{m}_{(K-1)W-1} & \cdots & \underline{m}_{(K-2)W} & \vdots & \vdots & \underline{m}_{W-1} & \cdots & \underline{m}_P \end{bmatrix} \times \begin{bmatrix} \underline{h}^{(1)} \\ \underline{h}^{(2)} \\ \vdots \\ \underline{h}^{(K)} \end{bmatrix} = \begin{bmatrix} r_w \\ r_{w+1} \\ \vdots \\ r_{L,m} \end{bmatrix}$$

Equation 4

$h^{(k)}$ is the channel response for the $k^{th}$ midamble. $r_i$ is the $i^{th}$ chip in the received combined midamble vector.

For short responses for burst types 1 and 2, the K convolutions are per Equation 5.

$$\begin{bmatrix} \underline{m}_P & \cdots & \underline{m}_{(K-1)W+1} & \vdots & \underline{m}_{(K-1)W} & \cdots & \underline{m}_{(K-2)W+1} & \vdots & \vdots & \underline{m}_W & \cdots & \underline{m}_1 \\ \underline{m}_1 & \cdots & \underline{m}_{(K-1)W+2} & \vdots & \underline{m}_{(K-1)W+1} & \cdots & \underline{m}_{(K-2)W+2} & \vdots & \vdots & \underline{m}_{W+1} & \cdots & \underline{m}_2 \\ \underline{m}_2 & \cdots & \underline{m}_{(K-1)W+3} & \vdots & \underline{m}_{(K-1)W+2} & \cdots & \underline{m}_{(K-2)W+3} & \vdots & \cdots & \vdots & \underline{m}_{W+2} & \cdots & \underline{m}_3 \\ \vdots & \vdots & \vdots & \vdots & \vdots & \vdots & \vdots & \vdots & \vdots & \vdots & \vdots & \vdots \\ \underline{m}_{KW-1} & \cdots & \underline{m}_{(K-1)W} & \vdots & \underline{m}_{(K-1)W-1} & \cdots & \underline{m}_{(K-2)W} & \vdots & \vdots & \underline{m}_{W-1} & \cdots & \underline{m}_P \end{bmatrix} \times \begin{bmatrix} \underline{h}^{(1)} \\ \underline{h}^{(9)} \\ \underline{h}^{(2)} \\ \vdots \\ \underline{h}^{(8)} \\ \underline{h}^{(16)} \end{bmatrix} = \begin{bmatrix} r_w \\ r_{w+1} \\ \vdots \\ r_{L,m} \end{bmatrix}$$

Equation 5

In Equations 4 and 5, the midamble sequence matrix is of size P by P. The partitions in Equations 4 and 5, indicated by vertical ellipses, represent the portion of $\underline{m}^{(k)}$ which yields a non-zero contribution of $\underline{m}^{(k)}$ and $\underline{h}^{(k)}$.

Equations 4 and 5 can be rewritten as Equation 6.

$$\underline{r} = G \cdot \underline{h} + \underline{n}$$

Equation 6

G is the midamble sequence matrix. $\underline{n}$ is the additive white gaussian noise (AWGN) vector.

Solving for $\underline{h}$, Equation 6 becomes Equation 7.

$$\underline{\hat{h}} = G^{-1} \cdot \underline{r}$$

Equation 7

$\underline{\hat{h}}$ is the estimate of the channel response vector.

A P point discrete Fourier transforms (DFT) can be used to solve Equation 7. Using the circulant structure of G, G can be expressed considering a column per Equation 8.

$$G = D_P^{-1} \cdot \Lambda_C \cdot D_P$$

Equation 8

$D_P$ is a P point DFT matrix per Equation 9.

$$D_P = \begin{bmatrix} \tilde{w}^0 & \tilde{w}^0 & \tilde{w}^0 & \tilde{w}^0 & \cdots & \tilde{w}^0 \\ \tilde{w}^0 & \tilde{w}^1 & \tilde{w}^2 & \tilde{w}^3 & \cdots & \tilde{w}^{(P-1)} \\ \tilde{w}^0 & \tilde{w}^2 & \tilde{w}^4 & \tilde{w}^6 & \cdots & \tilde{w}^{2(P-1)} \\ \tilde{w}^0 & \tilde{w}^3 & \tilde{w}^6 & \tilde{w}^9 & \cdots & \tilde{w}^{3(P-1)} \\ \vdots & \vdots & \vdots & \vdots & & \vdots \\ \tilde{w}^0 & \tilde{w}^{(P-1)} & \tilde{w}^{2(P-1)} & \tilde{w}^{3(P-1)} & \cdots & \tilde{w}^{(P-1)(P-1)} \end{bmatrix}$$

Equation 9

$\tilde{W}$ is defined as $\tilde{W} = e^{-j\frac{2\pi}{P}}$.

$\Lambda_C$ is a diagonal matrix. The main diagonal is the DFT of the first column of G per Equation 10.

$$\Lambda_C = \text{diag}(D_P(G(:,1)))$$

Equation 10

$G(:,1)$ represents the first column of matrix G.

$D_P$ is the discrete Fourier transform operator and $D_P \cdot \underline{x}$ represents the P point discrete Fourier transform of the vector $\underline{x}$.

Substituting Equation 8 into Equation 7 results in Equation 11, using the relationship of Equation 12.

$$\underline{\hat{h}} = \left(D_P^* \cdot \frac{1}{P} \cdot \Lambda_C^{-1}\right) \underline{r}$$

Equation 11

$$D_P^{-1} = \frac{D_P^*}{P}$$

Equation 12

$D_P^*$ is the element-by-element complex conjugate of $D_P$.

Considering a row, a diagonal matrix $\Lambda_R$ can be used to derive the channel estimation. Using a first row of G, $\Lambda_R$ can be derived per Equation 13.

$$\Lambda_R = \text{diag}(D_P(G(1,:)))$$

Equation 13

Since $G^T$ is also right circulant and its first column is the first row of G, $G^T$ is expressed per Equation 14.

$$G^T = D_P^{-1} \cdot \Lambda_R \cdot D_P$$

Equation 14

Since $D_P^T = D_P$, $\Lambda_R^T = \Lambda_R$ and for an invertible matrix A, $(A^T)^{-1} = (A^{-1})^T$, G is per Equation 15.

$$G = D_P \cdot \Lambda_R \cdot D_P^{-1}$$

Equation 15

By substituting Equation 15 into Equation 8, Equation 16 results.

$$\underline{\hat{h}} = \left(D_P \cdot \Lambda_R^{-1} \cdot \frac{1}{P} D_P^*\right) \underline{r}$$

Equation 16

A burst type 1 has a P of 456 chips and a burst type 2 has a P of 192 chips. Using a prime factor algorithm (PFA), Equation 11 or 16 can be solved for these bursts and the approach can be extended to cover other P lengths and other types of bursts. The PFA transforms each of the non-radix P-point DFTs into smaller DFTs of relatively prime lengths. This approach leads to savings in computational complexity.

Figure 5:
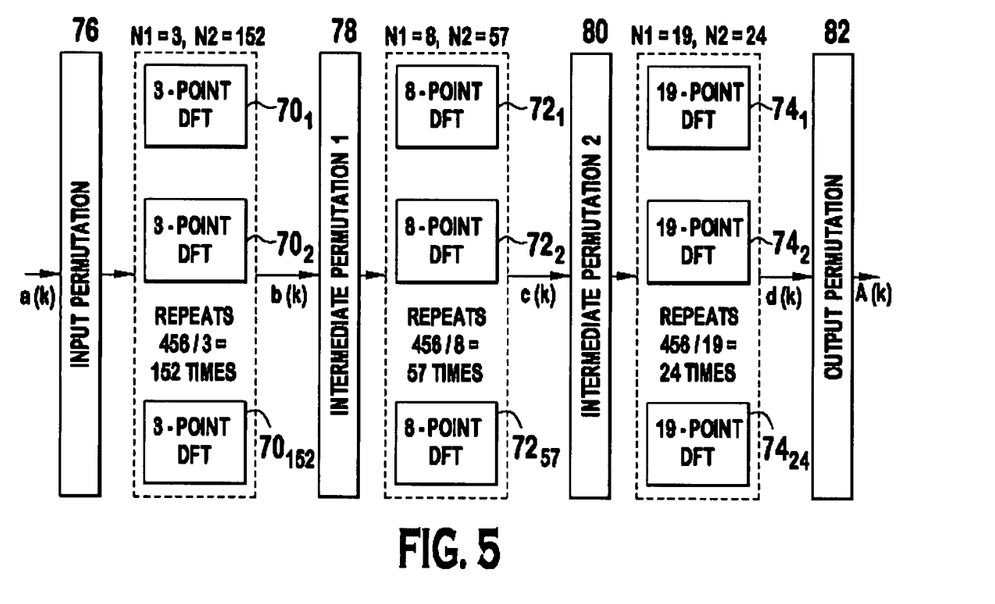
FIG. 5 is a preferred diagram of a 456 point discrete Fourier transform (DFT) implemented using a prime factor algorithm (PFA).

For a P of 456 chips, such as for burst type 1, a 456 point DFT is performed per FIG. 5. The DFT is performed in four stages. The input samples, a(k) are permuted by an input permutation block 76 prior to input into 152 3-point DFTs $70_1$-$70_{152}$ (70). The permutation is per Equation 17.

$$a_3(p) = a(<152p + 3q>_{456})$$

Equation 17

$<x>N$ demodes x modulus N, or x mod N. $a_3(p)$ is the $p^{th}$ input to the 3-point DFT 70, where p=0, 1, 2. q is a $q^{th}$ DFT, where q=0, 1, . . . , 151.

After being processed by the 3-point DFTs 70, an intermediate permutation block 1 78 permutes the results, b(k), prior to input to 57 eight point DFTs 72$_1$-72$_{57}$ (72). The permutation is per Equation 18.

$$a_8(p)=b(<57p+8q>_{456})\qquad\text{Equation 18}$$

$a_8(p)$ is the $p^{th}$ input to the 8-point DFT 72, where p=0, 1, . . . , 7. q is a $q^{th}$ DFT, where q=0, 1, 2, . . . , 56.

After being processed by the 8-point DFTs 72, an intermediate permutation block 2 80 permutes the results, c(k), prior to input to 24 nineteen point DFTs 74$_1$-74$_{24}$ (74). The permutation is per Equation 19.

$$a_{19}(p)=c(<24p+19q>_{456})\qquad\text{Equation 19}$$

$a_{19}(p)$ is the $p^{th}$ input to the 19-point DFT 74, where p=0,1, . . . , 18. q is a $q^{th}$ DFT, where q=0,1,2, . . . , 23.

Since the outputs of the 19-point DFTs 74 have been mapped, the results of the outputs of the 19-point DFTs 74 need to be reordered. An output permutation block 82 permutes the results, d(k), to produce the final frequency components A(k). The permutation is per Equation 20.

$$A(k)=d(<233k>_{456})\qquad\text{Equation 20}$$

k is the $k^{th}$ output of the 19-point DFTs, where k=0, 1, . . . , 455. 233 is the unscrambling factor, UF, UF=152+57+24.

To reduce the amount of memory used in the PFA, for each stage, samples can be read out of a single buffer, processed and saved into the vacated locations within the buffer. As a result, this PFA algorithm can be implemented using a single buffer of size 456.

Figure 6:
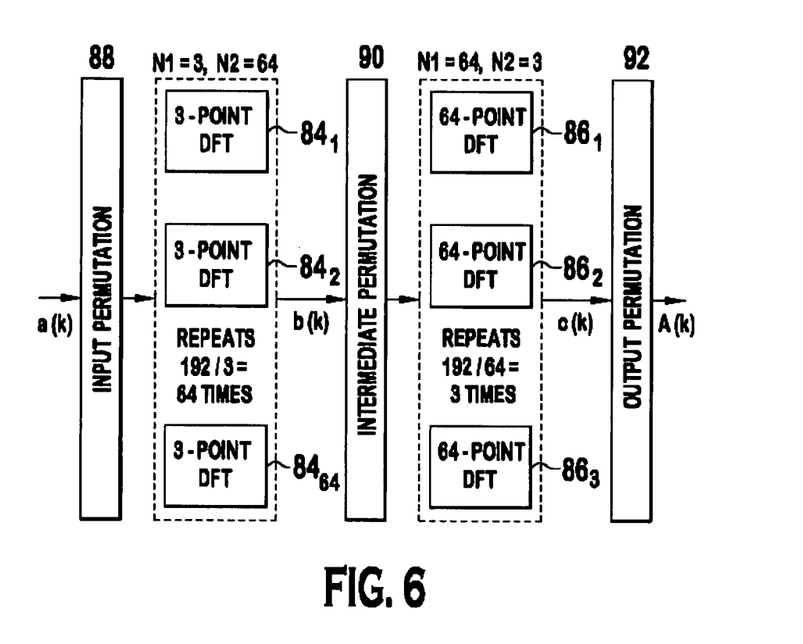
FIG. 6 is a preferred diagram of a 192 point DFT PFA.

For a P of 192 chips, such as for burst type 2, a 192 point DFT is performed per FIG. 6. The DFT is performed in four stages. The input samples, a(k) are permuted by a permutation block prior to input into 64 3-point DFTs 84$_1$-84$_{64}$ (84). The permutation is per Equation 21.

$$a_3(p)=a(<64p+3q>_{192})\qquad\text{Equation 21}$$

$a_3(p)$ is the $p^{th}$ input to the 3-point DFT 84, where p=0, 1, 2. q is a $q^{th}$ DFT, where q=0, 1, . . . , 63.

After being processed by the 3-point DFTs 84, an intermediate permutation block 90 permutes the results, b(k), prior to input to 3 sixty-four point DFTs 86$_1$-86$_3$ (86). The permutation is per Equation 22.

$$a_{64}(p)=b(<3p+64q>_{192})\qquad\text{Equation 22}$$

$a_{64}(p)$ is the $p^{th}$ input to the 64-point DFT 86, where p=0, 1, . . . , 63. q is a $q^{th}$ DFT, where q=0, 1, 2.

Since the outputs of the 64-point DFTs 86 have been mapped, the results of the outputs of the 64-point DFTs 86 need to be reordered. An output permutation block 92 permutes the results, c(k), to produce the final frequency components A(k). The permutation is per Equation 23.

$$A(k)=c(<67k>_{192})\qquad\text{Equation 23}$$

k is the $k^{th}$ output of the 64-point DFTs 86, where k=0, 1, . . . , 191. 67 is the unscrambling factor, UF, UF=64+3.

To reduce the amount of memory used in the PFA, for each stage, samples can be read out of a single buffer, processed and saved into the vacated locations within the buffer. As a result, this PFA algorithm can be implemented using a single buffer of size 192.

What is claimed is:

1. A method for estimating a channel experienced by a plurality of communication bursts transmitted substantially simultaneously, each burst having an assigned midamble, the method comprising:
   receiving a combined signal, the combined signal including a received version of each of the communication burst's midambles;
   processing the received combined signal to produce initial channel estimates;
   estimating noise of the received combined signal using the initial channel estimates;
   eliminating samples of the initial channel estimates not exceeding a first threshold producing processed channel estimates;
   detecting received midambles using the processed channel estimates; and
   using the detected midambles, processing the processed channel estimates to produce a channel estimate for each detected midamble.

2. The method of claim 1 wherein the received combined signal is sampled at a multiple of N of a chip rate producing N sets of samples such that each of the sets of samples are processed separately to determine the channel estimates for each detected midamble.

3. The method of claim 2 wherein the processed channel estimates resulting for the samples of each of the N sets is coherently combined prior to the step of processing the processed channel estimates to produce a channel estimate for each detected midamble.

4. The method of claim 1 wherein the processing the processed channel estimates includes eliminating samples of the processed channel estimates not exceeding a second threshold.

5. The method of claim 4 wherein the first and second threshold are a multiple of the noise variance.

6. The method of claim 1 wherein the noise estimate is a variance of noise.

* * * * *

UNITED STATES PATENT AND TRADEMARK OFFICE
CERTIFICATE OF CORRECTION

| | | |
|---|---|---|
| PATENT NO. | : 8,023,399 B2 | Page 1 of 1 |
| APPLICATION NO. | : 11/894282 | |
| DATED | : September 20, 2011 | |
| INVENTOR(S) | : Pan et al. | |

It is certified that error appears in the above-identified patent and that said Letters Patent is hereby corrected as shown below:

ON THE TITLE PAGE item (75) INVENTORS: after "Zeira", delete "Huntingdon" and insert --Huntington--.

Signed and Sealed this
Seventeenth Day of January, 2012

David J. Kappos
*Director of the United States Patent and Trademark Office*